United States Patent Office 3,448,489
Patented June 10, 1969

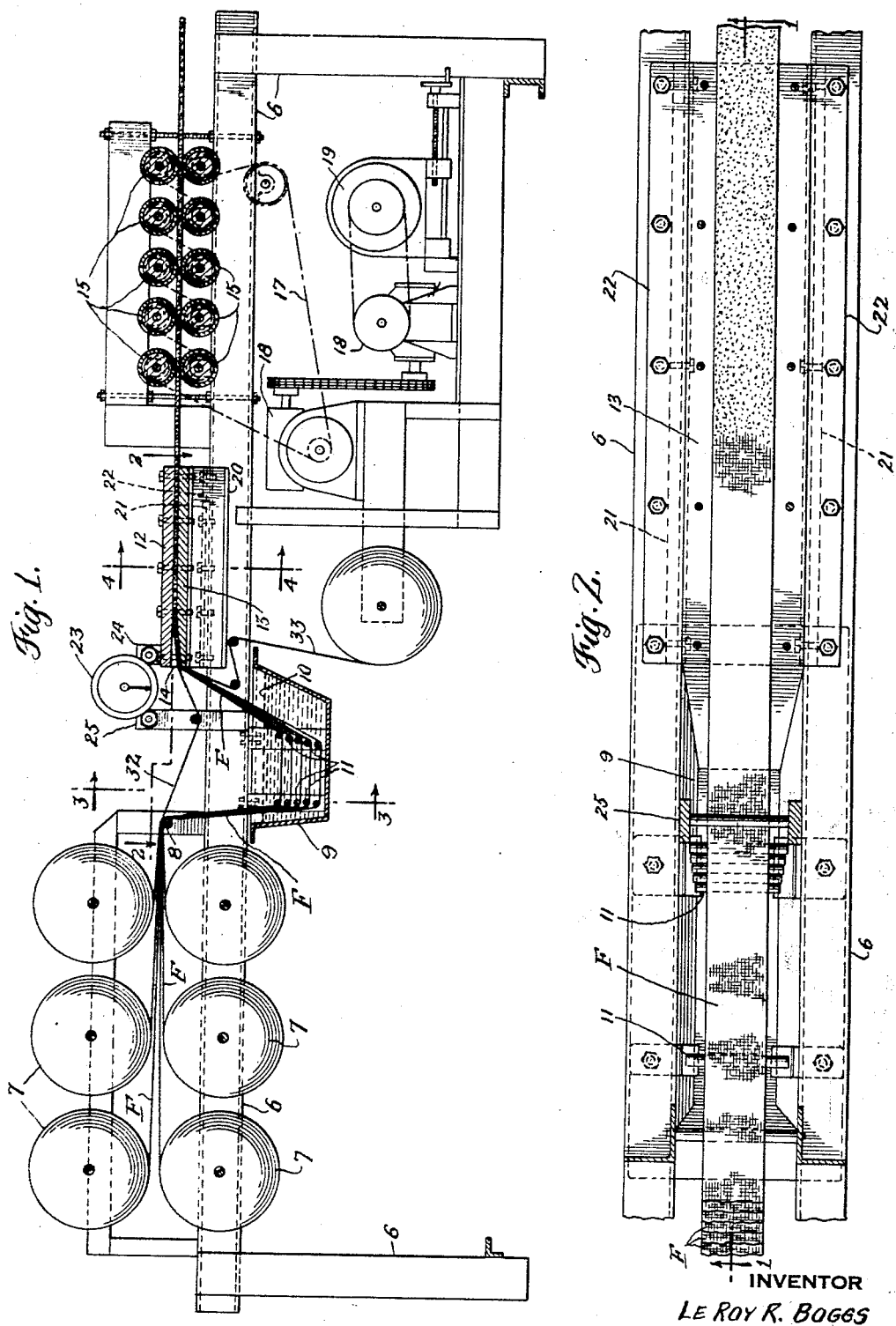

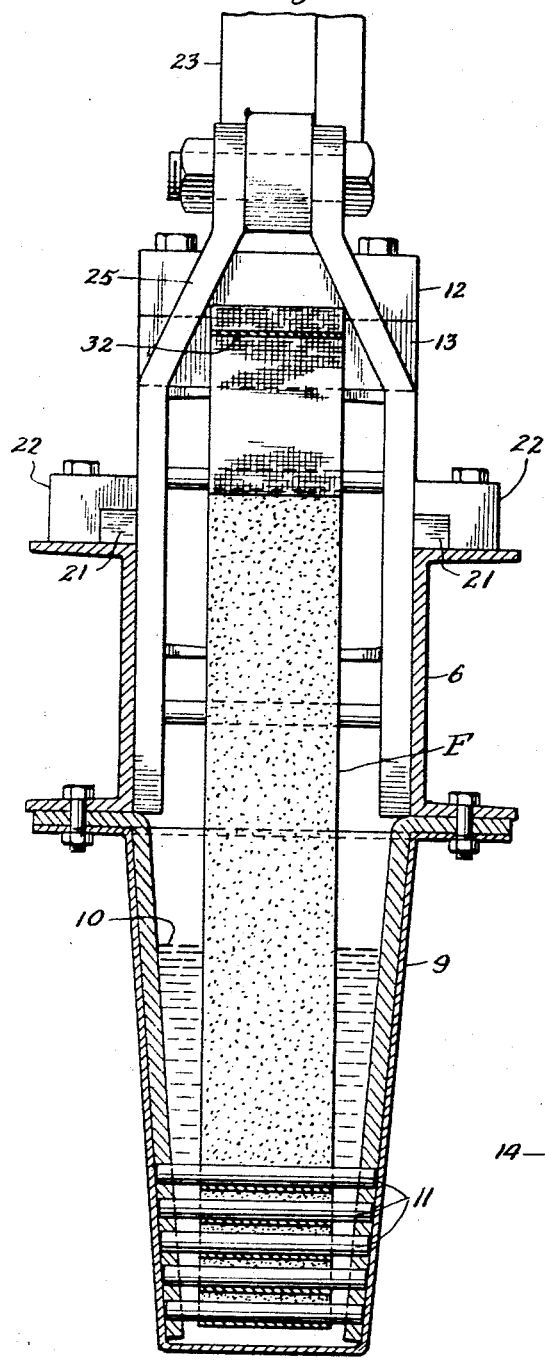
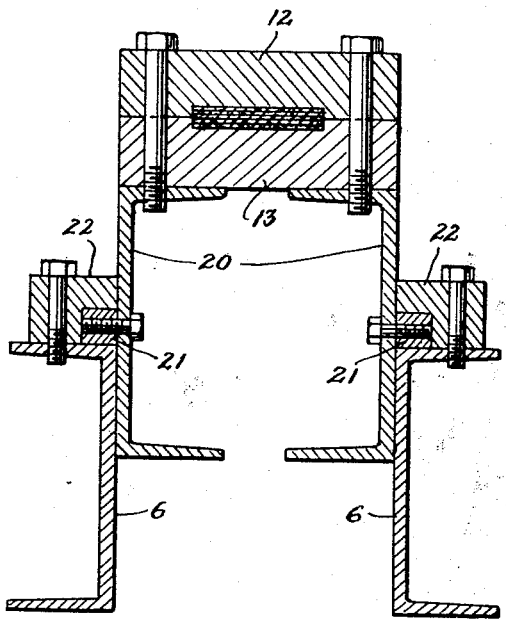
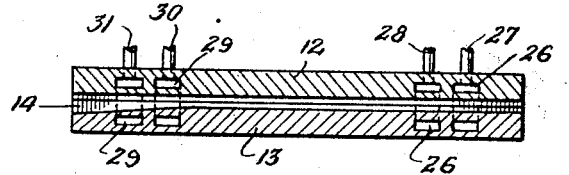

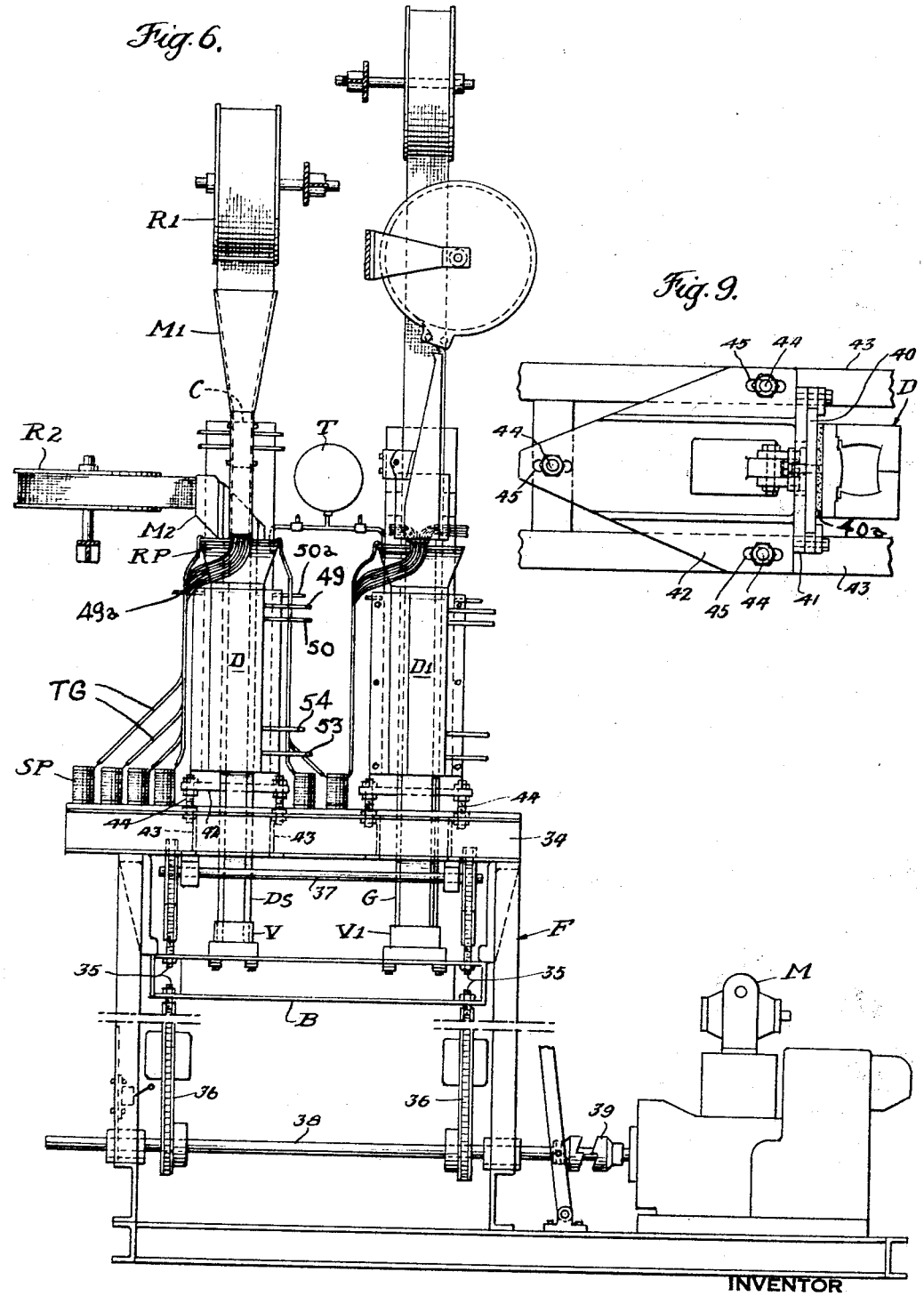

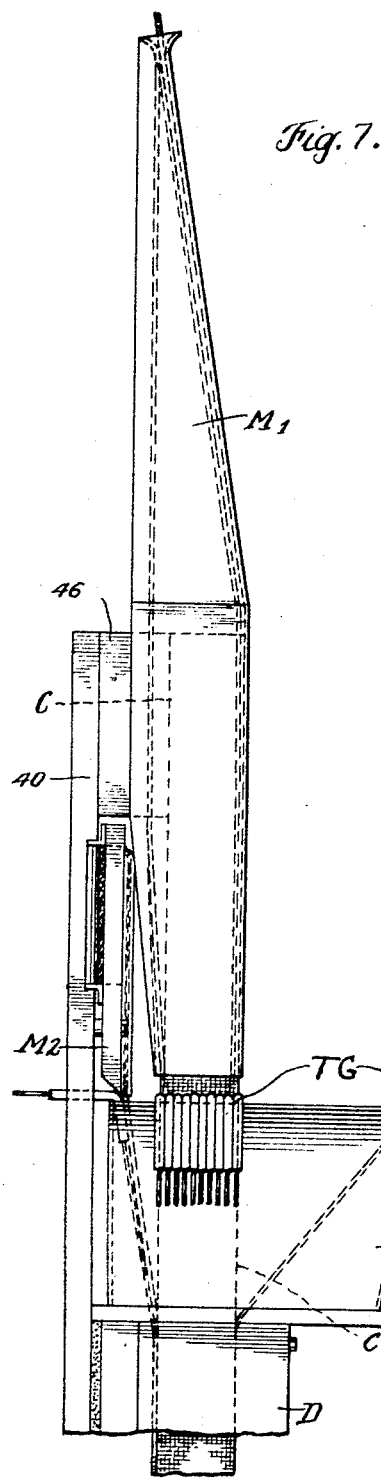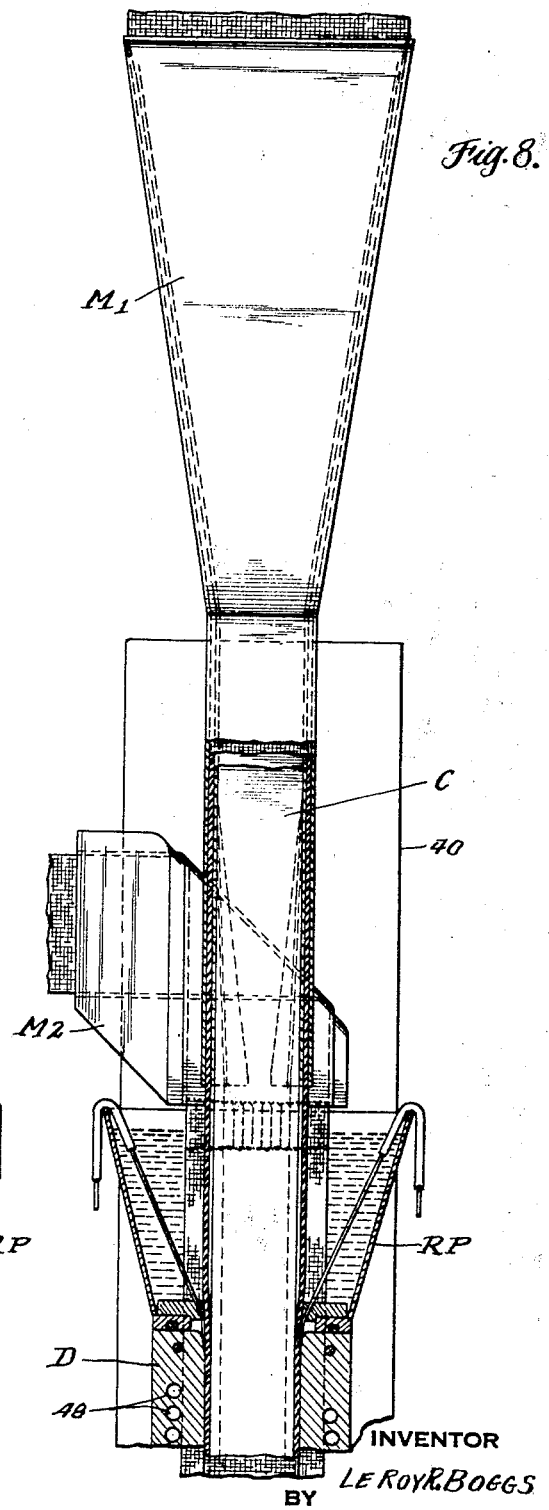

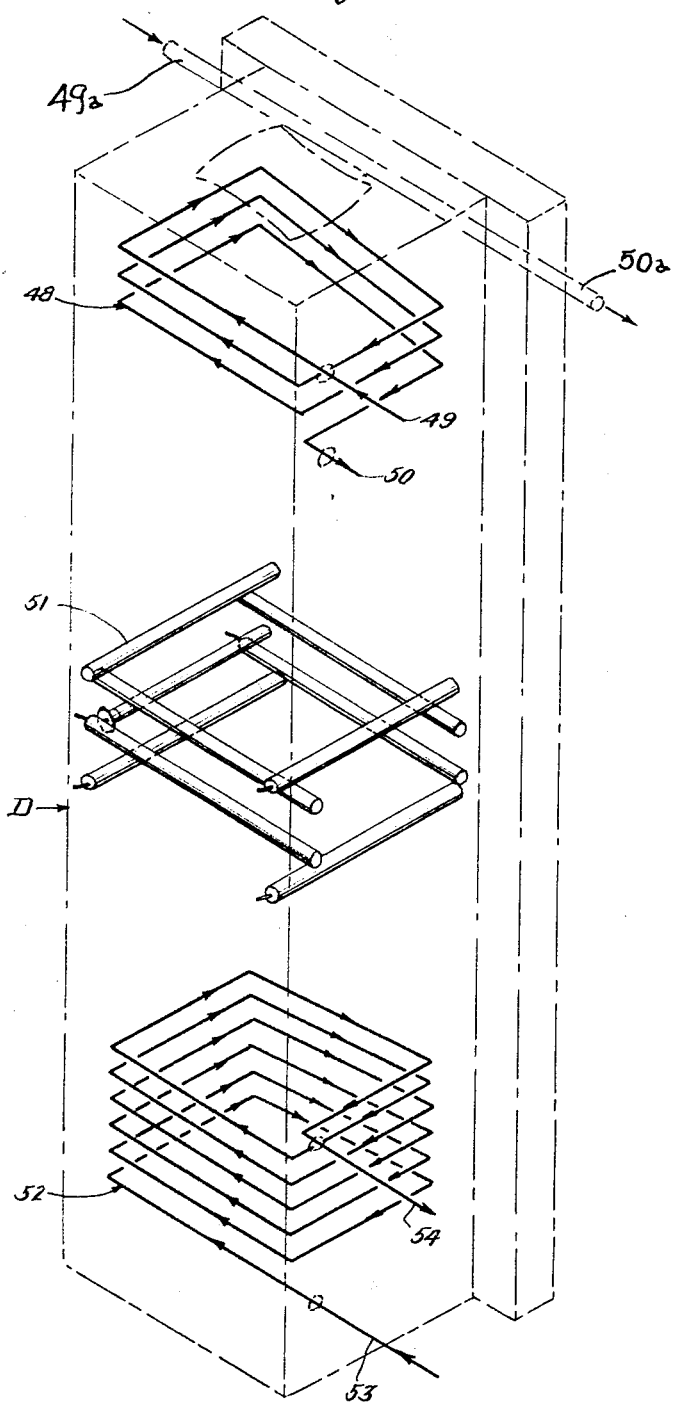
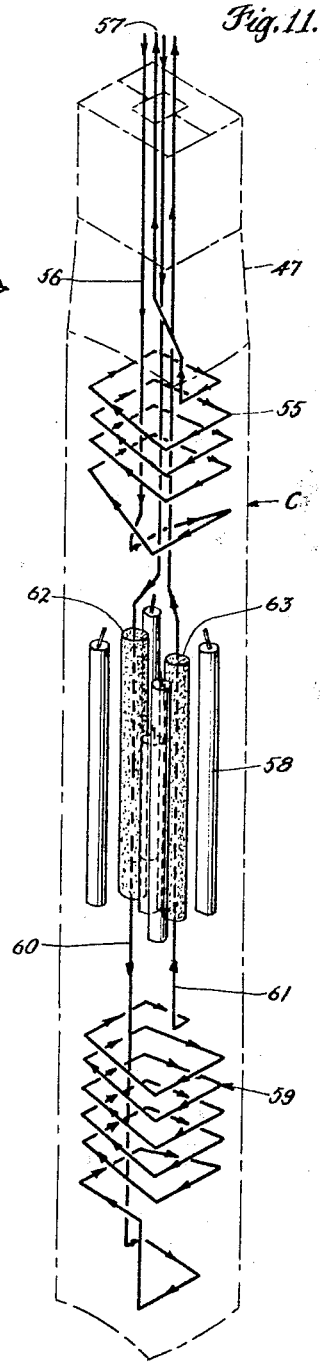

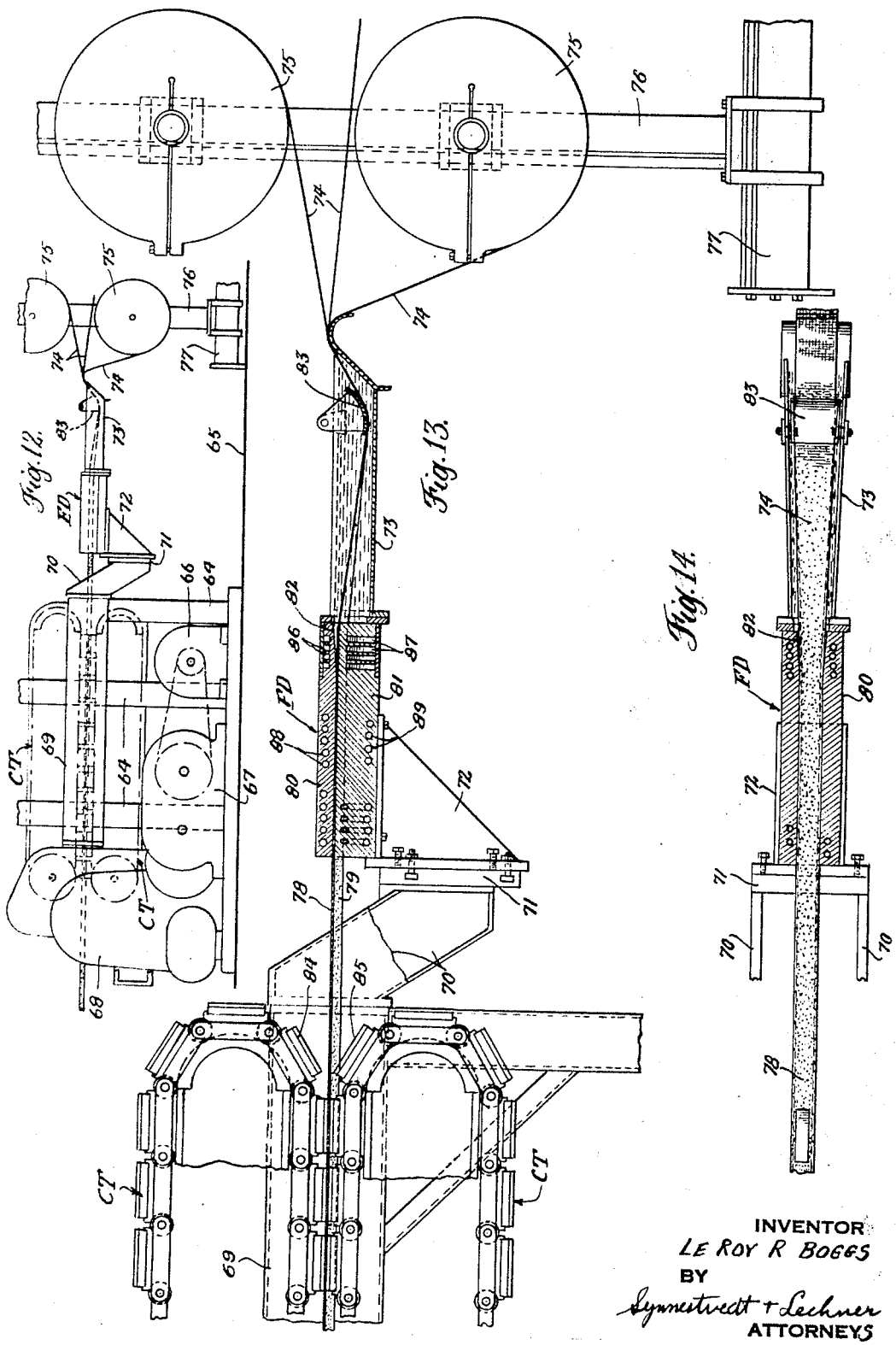

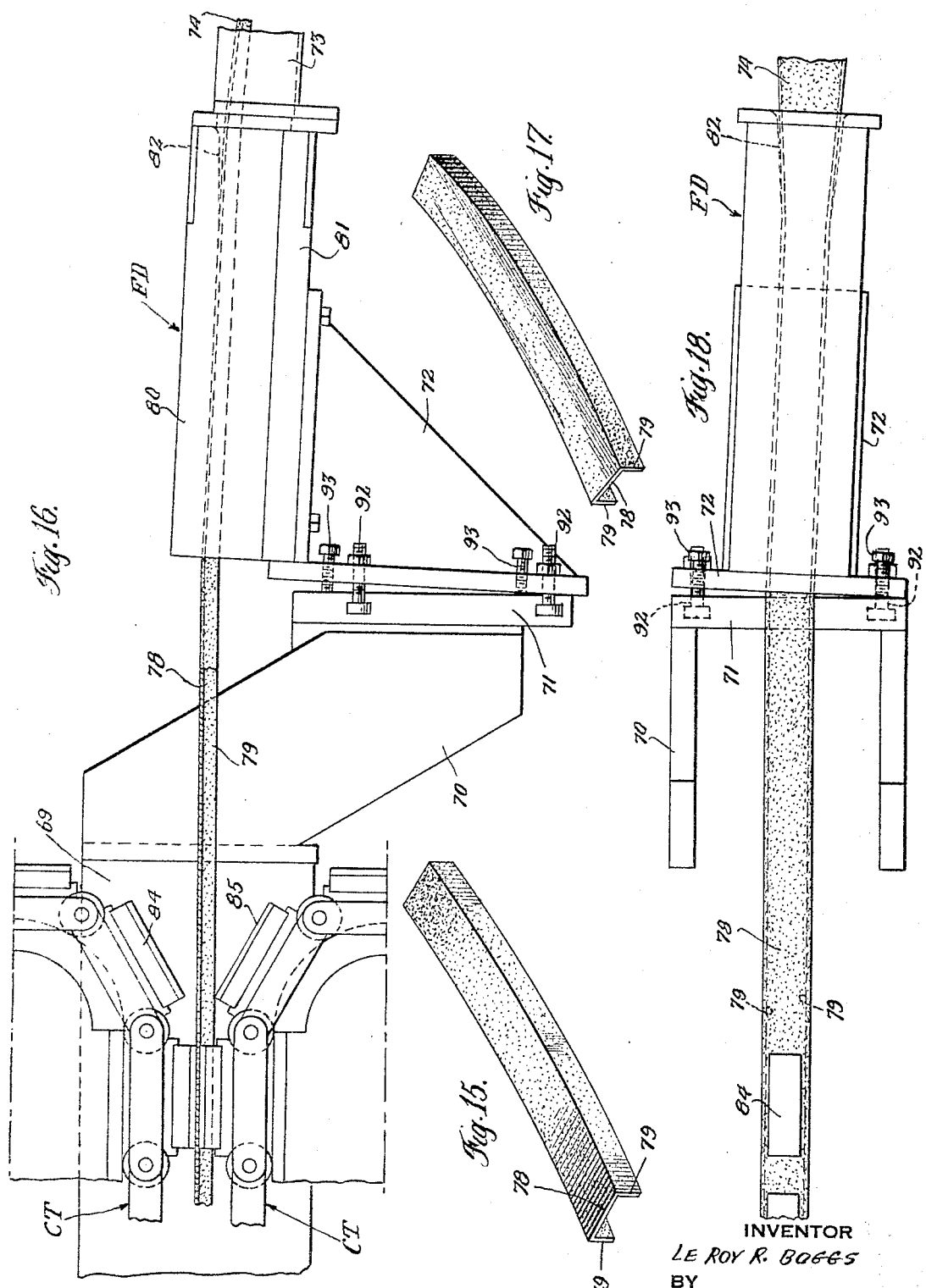

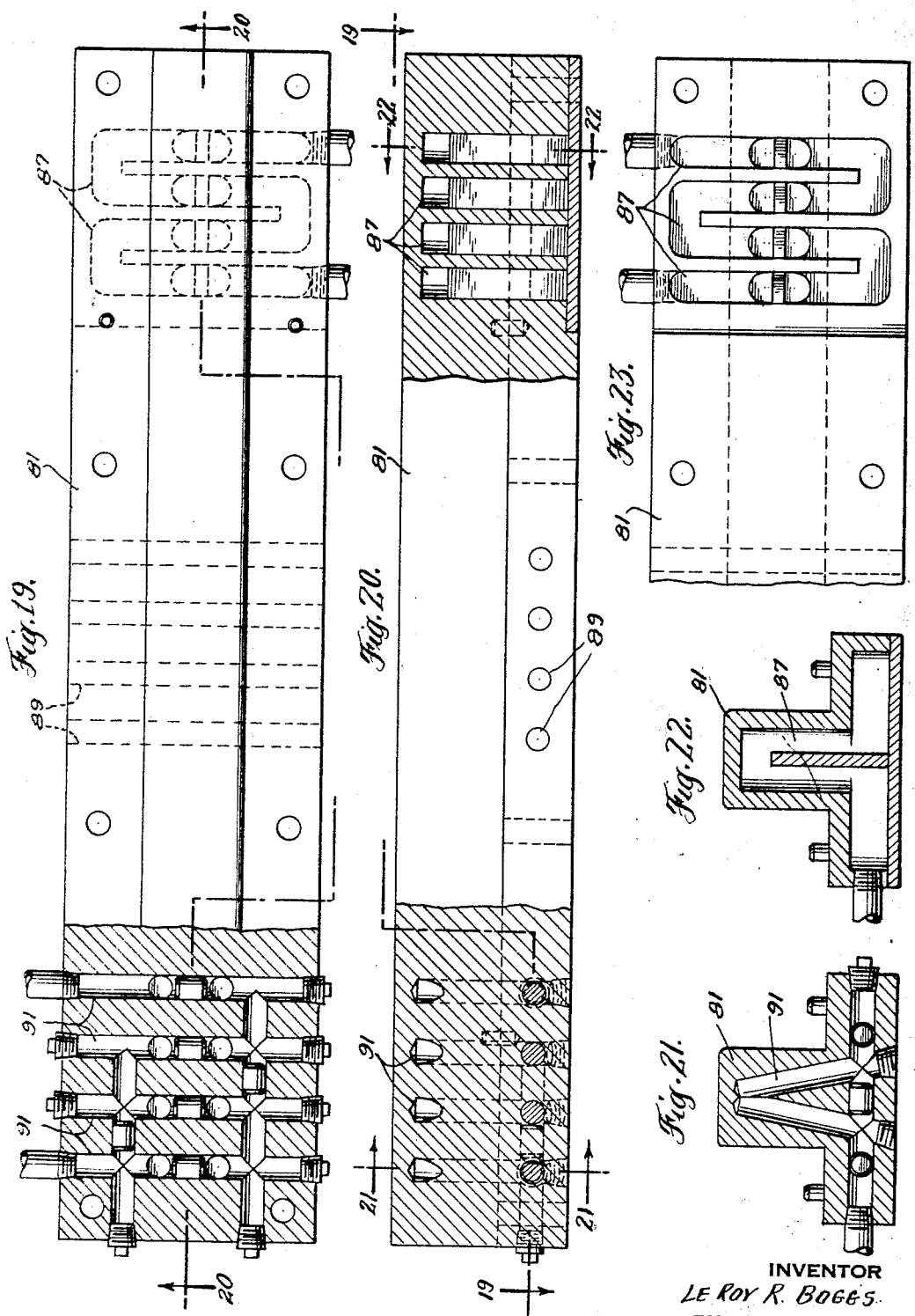

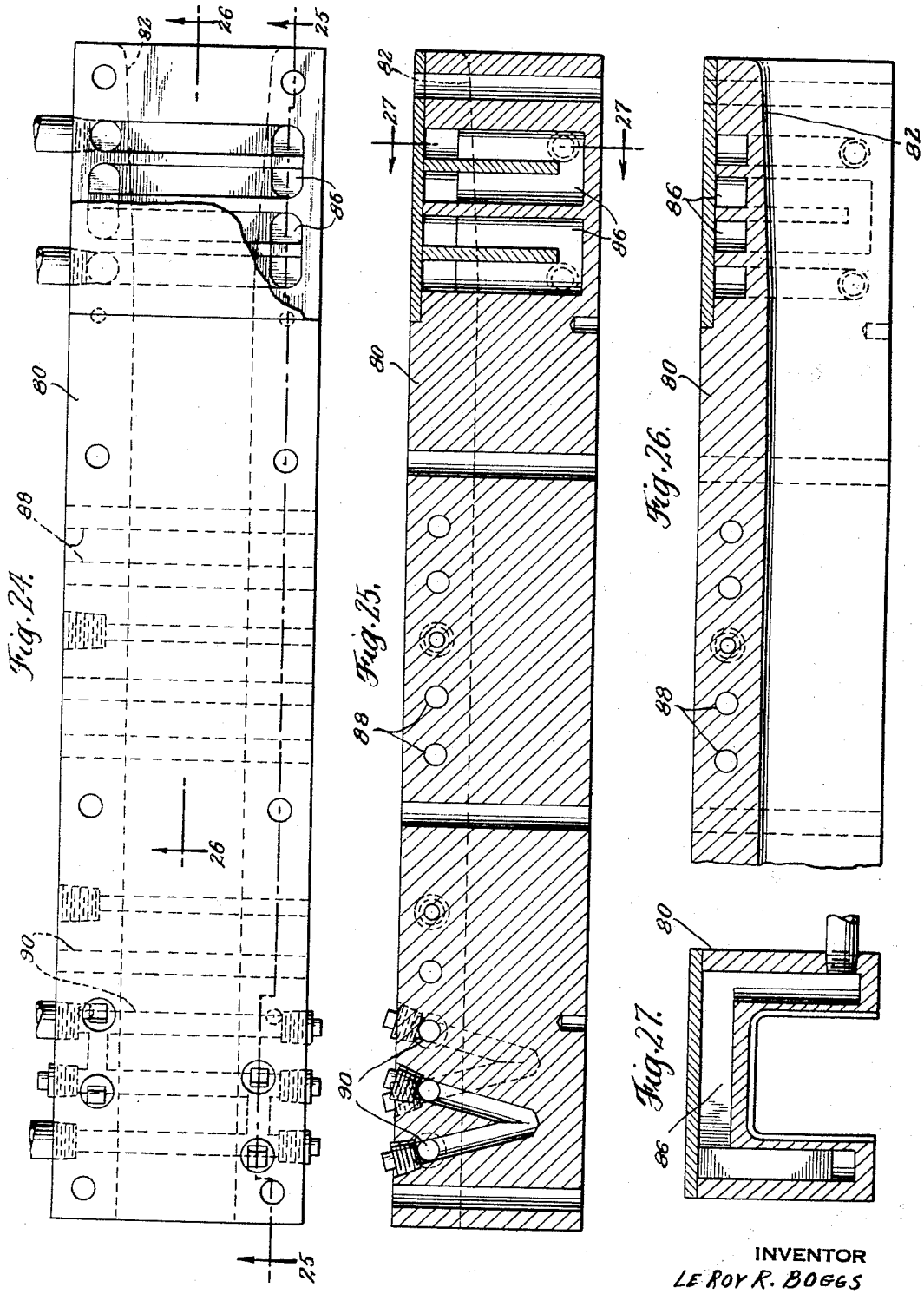

3,448,489
APPARATUS FOR FORMING ELONGATED ARTICLES FROM FIBER REINFORCED PLASTIC MATERIALS
Le Roy R. Boggs, Bristol, Tenn., assignor, by mesne assignments, to Koppers Company, Inc., Pittsburgh, Pa., a corporation of Delaware
Continuation-in-part of applications Ser. No. 2,760, Jan. 15, 1960, and Ser. No. 44,050, July 20, 1960. This application June 8, 1961, Ser. No. 115,633
Int. Cl. B29d 3/02; B29f 3/10
U.S. Cl. 18—4                                    6 Claims The present application is a continuation-in-part of my prior applications Ser. No. 2,760, filed Jan. 15, 1960, refiled Nov. 3, 1964, as Ser. No. 408,488, and issued Apr. 5, 1966, as Patent No. 3,244,784, and Ser. No. 44,050, filed July 20, 1960, issued May 25, 1965, as Patent No. 3,185,603.

This invention relates to the production or formation of fiber reinforced plastic articles, and the invention is particularly concerned with the production of such articles in the form of continuous or elongated shapes, for instance, slabs, bars, channels, tubes or the like.

Although the invention is adapted to the production of such articles or shapes from a variety of types of fiber reinforced plastic materials, the invention is particularly suitable to the production of such shapes from resin materials reinforced with glass fibers. The glass fibers may be in a variety of different forms, for instance rovings, mats, or woven fabrics in sheet or strip form.

The invention, moreover, is also particularly suitable to the production of shapes of the kinds mentioned from resin materials of the heat hardenable type, i.e., from thermo-setting resin materials. Typical of such resin materials are the polyester resins which, prior to curing, constitute relatively mobile liquids and which, after curing, constitute solids of considerable strength and toughness.

One of the principal objects of the invention is the provision of equipment and of an operating technique which is capable of producing various shapes from fiber and plastic materials of the kinds referred to while operating over extended periods of time, without requiring shutdown for cleaning, adjustment or the like.

It is a further object of the invention to make possible the production of shapes of the kinds referred to of uniform and accurate dimensions and also of uniform characteristics throughout even an extended run of the apparatus.

A further object of the invention is the provision of apparatus and an operating technique which not only enables continuous or substantially uninterrupted operation over extended intervals of time, but which also makes possible temporary cessation of the feed, as may be desirable for cutting off a length of article formed, without introducing imperfections in succeeding lengths of the article when the apparatus is again started and the feed continued.

In a typical operation according to the invention, the liquid heat settable resin material is used at room temperature. The fiber reinforcement is passed through a reservoir of the liquid resin and the fiber reinforcement is thereby impregnated with an excess of the liquid resin. The impregnated fiber reinforcement is then drawn through a forming device having a confining passage therein in which heat is applied so as to cure or set the resin, the feed of the materials and of the shape being formed being effected by a puller mechanism frictionally engaging the formed piece beyond the exit end of the forming device.

The confining passage in the forming device preferably has a tapered inlet end presenting an enlarged inlet opening, as compared with the cross-sectional area of the confining passage in the region of the heating and curing. By the action of the puller mechanism drawing the fiber reinforcement carrying the excess of impregnating resin into the confining passage, the excess resin is expelled.

According to the invention, the forming device and the resin reservoir are relatively arranged or positioned so that this excess of impregnating resin which is expelled from the entrance end of the forming device is returned into the resin reservoir; and the invention at the same time contemplates the provision of means for cooling the entrance end portion of the forming device preferably throughout the region of the taper of the inlet end of the confining passage. This relative positioning of the forming device and of the reservoir, and this cooling of the inlet end of the confining passage makes possible the initial impregnation of the fiber reinforcement with an excess of the resin and the return of the excess to the reservoir to avoid waste of resin material without, however, resulting in the return of any cured resin material to the supply reservoir. In a system of the kind here involved and especially where heat hardenable resins are being employed, if any appreciable quantity of cured or partly cured resin is returned to the reservoir, the result is a gradual build up of cured resin in the reservoir, with consequent stiffening of the material in the reservoir, so that succeeding lengths of the fiber reinforcement are no longer effectively impregnated, and with the further result that the resin materials being fed through the confining passage prematurely attain a certain degree of cure which has a tendency to cause sticking of the materials in the confining passage, and especially in the tapered inlet end portion which is preferably employed in order to thoroughly compact or compress the materials and expel gas and air bubbles prior to the time the materials reach the portion of the confining passage which is of uniform cross-sectional area and in which the heat is applied for the intended curing and solidification of the piece or shape.

It is noted that certain of the subject matter disclosed herein is also disclosed and claimed in my companion application Ser. No. 247,189, filed Dec. 26, 1962 issued May 25, 1965, as Patent No. 3,185,747.

In various preferred embodiments of the equipment according to the invention, the resin supply or reservoir is desirably closely or intimately associated with the entrance end of the forming device. Indeed, in certain preferred embodiments, the portions of the forming device surrounding the inlet opening to the forming device actually constitute a part of the wall of the resin reservoir itself, being submerged below the level of the resin bath in the reservoir. In a preferred arrangement of this kind, the invention also contemplates cooling those portions of the forming device which surround the inlet opening to the confining passage and which are exposed to the resin in the reservoir, and in this way the invention avoids transmission of the curing heat through the body or mass of the forming device from the heating region provided for curing, back into the resin in the reservoir.

According to the invention, effective puller or feed mechanism is also provided to deliver a large pulling force capable of overcoming very large loads or resistance which may be encountered, for instance in the formation or extraction of pieces of complicated cross section or large size. In a preferred arrangement, the puller mechanism has a frame structure mounted upon a firm foundation and having at one end a thrust carrying abutment or bracket structure on which the forming device is preferably directly mounted and carried, with the axis of the confining passage in general alignment with the line of pull through the puller mechanism. In this way the heavy loads required for pulling various shapes through the device are directly taken on the frame of the puller mechanism itself and accurate and chatter-free action is thereby provided.

In considering still another aspect of the invention it is pointed out that in the formation of various special shapes, for instance a channel piece, a tendency is sometimes encountered, depending upon the distribution and kinds of fiber reinforcement employed and also upon other factors, for the piece to warp in one plane or another. I have found that such warpage can be substantially eliminated by arranging the axis of the confining passage in the forming device in a certain angular relation to the line of pull through the puller mechanism. The invention, therefore, contemplates the use of a mounting mechanism provided for positioning of the axis of the forming device in various different angular relations with the line of pull through the puller mechanism, in a manner to correct for any tendency for the piece to warp in one plane or another.

The foregoing and other objects and advantages of the invention will appear more fully from the following description which refers to three different embodiments of the invention, all of which are illustrated in the accompanying drawings.

In the drawings, one embodiment is illustrated in FIGURES 1 to 5 inclusive, these figures also appearing in my copending application Ser. No. 2,760 above referred to. In this group of figures:

FIGURE 1 is an elevational view, with certain parts in vertical section, showing a machine constructed according to the invention for the continuous manufacture of fiber reinforced resin strip, the sectional parts of this view being taken in the vertical plane indicated by the line 1—1 on FIGURE 2;

FIGURE 2 is a plan view of a portion of the apparatus shown in FIGURE 1, this view being on an enlarged scale and being taken as indicated by the line 2—2 on FIGURE 1, with certain parts shown in horizontal section and with upper parts removed, for the sake of clarity;

FIGURE 3 is a transverse sectional view taken as indicated by the section line 3—3 on FIGURE 1, this view being on an enlarged scale as compared with the scales of both FIGURE 1 and FIGURE 2;

FIGURE 4 is a view on the scale of FIGURE 3 but taken as indicated by the section line 4—4 on FIGURE 1;

FIGURE 5 is a view of the forming device shown in FIGURE 1, on a somewhat enlarged scale, and further illustrating certain heat transfer passages provided in the walls of the forming device;

FIGURE 6 to 11 inclusive represent a second embodiment, these figures corresponding, respectively, to FIGURES 1, 6, 7, 25, 12 and 13 of copending application Ser. No. 44,050 above identified. In this group of figures:

FIGURE 6 is an elevational view of a machine for producing two articles at the same time, for instance, a rain gutter and a downspout, the left hand unit of the machine shown being for producing the downspout and the right hand unit for producing the gutter, there being parts broken away in the lower portion of this view, to reduce the height thereof;

FIGURE 7 is an enlarged fragmentary vertical sectional view through the upper portion of the unit shown in FIGURE 6 to the left of that figure;

FIGURE 8 is a view similar to FIGURE 7 but in which the section is taken at right angles to the section of FIGURE 7;

FIGURE 9 is a fragmentary view showing in plan certain mounting parts for the forming device of the left hand unit of FIGURE 1;

FIGURE 10 is a diagrammatic isometric view illustrating cooling passages and the location of heater elements in the die structure of the left hand unit of FIGURE 1; and FIGURE 11 is a view similar in character to FIGURE 10 but illustrating cooling passages and heater elements of the core structure of the left hand unit of FIGURE 1.

FIGURES 12 to 27 inclusive illustrate a third embodiment of the invention, and these figures, respectively, show parts of the apparatus, as follows:

FIGURE 12 is a small scale overall elevational view, with parts shown only diagrammatically, to illustrate the overall arrangement of the third embodiment of the apparatus;

FIGURE 13 is an enlarged view of parts shown in FIGURE 12, certain parts being broken out and with the die structure and resin pan shown in vertical section;

FIGURE 14 is a plan view with parts in horizontal section corresponding to certain portions of FIGURE 13;

FIGURE 15 illustrates a channel member formed by the process of the present invention and indicates a type of warpage which sometimes tends to occur;

FIGURE 16 is a further enlarged elevational view of certain parts shown in FIGURES 12, 13 and 14 and particularly illustrating the manner of relative positioning of certain of those parts for the purpose of correcting for the warpage illustrated in FIGURE 15;

FIGURE 17 is a view similar to FIGURE 15 but illustrating a different type of warpage of a channel member;

FIGURE 18 is a view similar to FIGURE 16 but showing the apparatus in plan, rather than in elevation, and illustrating the adjustment effected to correct for warpage of the kind shown in FIGURE 17;

FIGURE 19 is a further enlarged view, partly in horizontal section taken as indicated on the line 19—19 of FIGURE 20 and showing the lower portion of the die structure of the third embodiment;

FIGURE 20 is a view taken on the line 20—20 of FIGURE 19 and showing in elevation, with parts in vertical section, the lower part of the die structure which is also shown in FIGURE 19;

FIGURES 21 and 22 are transverse sectional views taken as indicated by the section lines 21—21 and 22—22, respectively, on FIGURE 20;

FIGURE 23 is a fragmentary view of the bottom of the right hand end portion of the lower die part shown in FIGURE 19;

FIGURE 24 is a plan view, with parts broken away toward the right of the figure, showing the upper part of the die structure of the third embodiment.

FIGURE 25 is a vertical sectional view of the die structure shown in FIGURE 24, this view being taken on the line 25—25 of FIGURE 24;

FIGURE 26 is a fragmentary vertical sectional view taken as indicated by the line 26—26 on FIGURE 24, and FIGURE 27 is a transverse sectional view taken as indicated by the line 27—27 of FIGURE 25.

Referring now to the form of FIGURES 1 to 5, the reference numerals 6 designate a main frame or support structure for the apparatus. A plurality of spools 7 are shown for supplying fiber reinforcing material, in the case shown, this material constituting woven glass fiber strips F. The fabric strips from these supply spools 7 are fed horizontally over a guide 8 and thence downwardly into an impregnating reservoir 9 adapted to contain a supply of a heat hardenable resin in liquid state, as indicated at 10. The several fabric strips are passed over separated pairs of guides 11 provided below the surface of the resin in the reservoir 9, in order to insure thorough impregnation of each strip with the resin. The several strips are then drawn upwardly and out of the reservoir and into the entrance end of a forming device, upper and lower portions of which are indicated at 12 and 13. As best seen in FIGURES 4 and 5, the upper and lower parts of the forming device are shaped to provide a confining channel therebetween, through which the impregnated strips are drawn. Toward its entrance end, the confining channel in the forming device is tapered to provide an enlarged inlet opening as is clearly shown at 14 in FIGURE 5.

The main portion of the channel, i.e., beyond the tapered entrance portion, is preferably of substantially uniform cross section and preferably also substantially straight to aid in forming a straight and accurately dimensioned piece.

Beyond the delivery end of the channel in the forming device, there are arranged a plurality of pairs of friction rolls or rollers 15 between which the completed strip is passed, and by means of which the strip is drawn through the forming device. Thus, these feed rolls at the delivery end of the apparatus serve to draw the reinforcing fibrous strips from the supply spools and also to draw those strips through the impregnating bath, as well as to draw the strip being formed through the forming device. The feed rolls 15 are preferably driven by means of a belt or chain such as indicated at 17 which is actuated through one or more reduction gearing units 18, connected with a motor 19. Although five pairs of drawing or feeding rollers are illustrated, in the case of a simple small flat strip such as shown in FIGURE 4 it may not always be necessary to employ as many as five pairs of rollers.

As shown in FIGURE 4 the forming device 12–13 is mounted by means of a pair of channel members 20 which carry guides 21 working in guide slots formed by means of brackets 22 mounted to the top flanges of the main frame channels 6. The forming device is thus mounted with freedom for movement in a direction generally parallel the direction of movement of the strip being formed through the channel in the forming device. A gauge for measuring the pull being exerted on the strip by the feed rolls 15 is indicated at 23, this gauge being connected by means of a bracket 24 to the forming device and also to a fixed anchor point 25. In operation, the slide mounting of the forming device (as described just above with reference to FIGURE 4), together with the gauge 23, permits continuous direct reading of the pull required for delivery of the strip through and from the forming device.

Although the apparatus of FIGURES 1 to 5 has been illustrated and described as positioned for generally horizontal feed of the materials and the formed article, it will be understood that it may be differently arranged.

In accordance with the invention, it is contemplated to employ heat settable or heat hardenable resin or plastic materials having a liquid stage and a solid stage after curing. Thermosetting polyester laminating resins, are effectively used, for instance the resin identified P–43 as marketed by Rohn and Haas Company. Such a resin is advantageously used with a small quantity, for instance about 1% of a hardener, such as benzol peroxide. For such heat hardenable resin or plastic materials, the invention contemplates heating the forming device. While this may be done in a variety of ways, such as by electric heating elements, it may be done by circulation of a heat transfer medium through channels formed in the upper and lower parts 12 and 13 of the forming device, for instance channels such as indicated at 26 in FIGURE 5, having an inlet 27 and an outlet 28. As the forming device is preferably formed of metal, the heat applied tends to be conducted throughout the body of the forming device, and I have found that heating of the forming device throughout the entire length of the confining channel has a tendency to cause the resin material to prematurely cure in the entrance end portions of the channel and to stick or jam therein. With this in mind, the arrangement of FIGURES 1 to 5 is arranged to establish a temperature gradient throughout the length of the confining channel, with the low end of the temperature scale toward the entrance end of the channel, and with the high end of the temperature scale toward the exit end of the channel. This is desirably accomplish by employment of a heating means associated with the exit end portions of the forming device, while at the same time providing cooling means associated with the inlet end portions of the forming device. The cooling means may take a variety of forms, but advantageously comprise channels 29 for circulation of cooling liquid, for instance, water at ordinary water supply temperatures or, if desired, refrigerated, the cooling passages being provided with inlet 30 and an outlet 31 as shown in FIGURE 5.

The arrangement of the first embodiment as described above which is also illustrated and described in my co-pending application Ser. No. 2,760, above referred to, provides, upon passage of the fiber reinforcement through the resin bath, for the impregnation of the fiber reinforcement with an excess of the resin. Since a thermosetting or heat hardenable resin is employed in accordance with the present invention, the resin material in the liquid stage in which it is introduced into the reservoir constitutes a mobile liquid which will readily wet and penetrate the fiber reinforcement. Indeed, the impregnation is of such character as to apply to the fiber reinforcement an excess of the resin. The excess resin material is then expelled by virtue of the feed or drawing of the impregnated fiber reinforcement into and through the forming device. The tapered inlet portion of the die is particularly effective in compressing or compacting the impregnated fibrous mass and at the same time expelling the excess resin. In addition, this action expels gas or air bubbles and thereby avoids development of porosity in the piece being formed.

Because of the relative location of the forming device above and with the inlet end projecting over the resin reservoir 9, the excess of resin expelled from the fibers is returned to the supply of resin in the reservoir.

It is of advantage and importance that the fibers be thoroughly impregnated with the resin material and this is assured by virtue of impregnating with an excess of the resin; and at the same time it is economically advantageous to reuse the expelled excess of the resin. However, in a system of this kind, especially because of the use of a thermosetting resin material, if the excess of resin which is returned to the reservoir were wholly or partially cured, it would result in gradual build up of resin in the cured state in the reservoir. In the equipment and process according to the first embodiment as described above, this is avoided by virtue of the cooling of the entrance end portion of the forming device or die structure. As fully brought out hereinabove, this cooling is effected by passage of a cooling liquid through the channels 29 which are arranged (see FIGURE 5) in the die structure adjacent to the inlet end, and especially in the region of taper of the inlet end portion of the confining passage through the die structure.

Because of the substantial elimination of curing of the resin in the region of the inlet portion of the die by the cooling action of that part of the die structure, any tendency for deposits of cured resin to build up in the inlet portion of the die in eliminated and this is of importance in reducing or eliminating sticking of the materials in that part of the die, which would be particularly troublesome in view of the fact that the inlet portion of the die is tapered.

Although with certain articles or shapes, all of the fibrous material employed may be impregnated prior to passage through to the forming device, for some purposes it is desirable to feed to the forming device certain fibrous material in unimpregnated condition. For example, the feeding of strips such as indicated at 32 and 33 at opposite faces of the impregnated strips F improves the smoothness of operation and tends to minimize sticking in the forming device even though these strips become saturated or impregnated by contact with the impregnated strips by the time they pass part way through the forming device. The entire article therefore at the delivery end of the apparatus has a structure which is sound or substantially free of porosity throughout the cross section thereof, notwithstanding the fact that cerain marginal or surface strips are initially fed in unimpregnated condition.

The importance of employing unimpregnated strips or fibrous material at certain surfaces of the article being formed depends somewhat upon the cross sectional shape of the article. For example, in the case of a piece having angles or corners, resin material sometimes tends to deposit and accumulate in the corners and the feed of unimpregnated fibrous material through those corners tends to sweep out particles of resin tending to be deposited there. For this same purpose I have found it is sometimes desirable, in the case of formation of relatively thin strip, to feed fibrous material, for example, in the form of glass fiber roving, in unimpregnated form at the two edges of the strip.

This feed of impregnated and unimpregnated strip or other fibrous material may be altered in various ways, according to the shape of the article being formed.

It should be further understood that the form of the fibrous material may be varied. Indeed, the fibrous material may be fed in the form of woven strip, as already mentioned above, or it may be fed in the form of glass fiber mat. Still further, a multiplicity of threads or rovings may be fed, instead of one or more mats or strips. For certain purposes, certain other types of fibrous material may be employed, i.e., other than glass. Moreover, certain other materials or pieces may be fed along with the reinforcing fibers, such as metal pieces, wood strips or the like.

As above indicated the strip or other article being formed may be continuously delivered from the apparatus and may be wound in a coil, or may be cut off to desired lengths. In the latter event, and also for any other purposes that may be desired, the feed of the materials and the article through the apparatus need not necessarily be completely continuous, but may be interrupted, at least for intervals of time such as required to cut off lengths of formed article, or to perform other desired operations on the articles being produced. It is of advantage that the process may be interrupted and started again without leaving any appreciable defects in the piece being formed. While for many purposes it would be preferred to operate the apparatus continuously, various features of the invention are also applicable where the feed is interrupted or is intermittent, although it should be noted that even in such event, if desired, the method and apparatus may nevertheless be employed in the production of articles or pieces of continuous or indefinite length. The word "continuous" therefore is used herein in a broad sense, although it is not intended to apply to such operations as the piecemeal formation of articles by means of mating molds which are opened and closed for each operation.

It should still further be understood that the number and arrangements of strips being fed will vary according to the cross section of the piece being formed, the shape of the forming device itself also being varied according to the shape of the piece desired.

Turning, now, to the second embodiment which is shown in FIGURES 6 to 11 inclusive, and which is also similarly illustrative and described in my copending application Ser. No. 44,050, it is first pointed out that in this second embodiment, the general flow direction of the materials, instead of being substantially horizontal as in the first form described above, is arranged substantially vertically, the flow of fiber reinforcement being from a high point downwardly through the apparatus, with the puller mechanism located below the forming device or devices.

As mentioned above, in FIGURE 6 there is illustrated an apparatus incorporating two units or machines, the left hand unit being arranged to produce downspout, and the right hand unit being arranged to produce a rain gutter. In FIGURE 6 the downspout emerging from the lower end of the left hand unit is indicated by the letters DS, and the gutter is indicated emerging from the lower end of the right hand unit by the letter G.

For purposes of the present description, it will suffice to give some consideration to the arrangement of the downspout unit only, and the following description will be limited to that portion of the apparatus of FIGURE 6, various parts of the downspout unit also being shown in FIGURES 7 to 11.

Referring now to FIGURE 6, both the downspout DS and the gutter G are adapted to be drawn simultaneously through the apparatus by a single clutch controlled reduction gear drive motor M. Separate operation of these two units could of course be employed, but when simultaneously operated, the leading ends of both the downspout DS and the gutter G are clamped to a vise beam B by means of vises V and V1, respectively.

The apparatus in general comprises suitable framework F mounted on a firm foundation such as a floor or base which frame carries not only the vise beam B and its actuating mechanism, but also the other or upper portions of the apparatus including the forming dies and certain of the parts associated therewith. Mat reels R1 and R2 supply strip form of glass fiber reinforcement to the downspout unit, this unit also being supplied with rovings from spools SP, preferably also of glass fiber. The rovings are fed through tubular guides TG. The unit further consists of a forming device comprising a die structure D and a core structure C which are mounted on the horizontal framing parts 34 of the framing structure F. The die and core cooperate to provide an annular passage for the feed of the glass fiber reinforcement and of the resin to effect the formation thereof and thereby produce the downspout. At the upper end of the die structure D there is arranged a resin reservoir or pan which is identified by the letters RP, this resin pan being supplied with liquid heat settable resin from the supply tank T, the level of which is indicated in FIGURE 8. The mat or fabric reinforcements supplied from the reels R1 and R2 are preshaped in their passage from the reels into the resin bath by means of mat guides indicated at M1 and M2. This preshaping provides for bending of the mats and delivery of various parts of the mats into different wall portions of the downspout being formed, so that all portions of the downspout will have fiber reinforcement therein.

Downward movement is imparted to the vise beam B to pull the preshaped dry mats, and the rovings through the resin pan RP, and this effects impregnation of the fiber reinforcement with the liquid resinous material prior to entrance thereof into the annular confining passage formed between the die and core elements of the forming device. The resins contemplated for employment in this embodiment are the same resins mentioned hereinabove for employment in the first embodiment. It may here further be mentioned that in accordance with the present invention the resin material is desirably cured in the forming device at a temperature well above the heat distortion point of the particular resin. With resins of the kind hereinabove mentioned, the heat distortion point is in the neighborhood of 200° F. The curing, therefore, is preferably effected within a range of temperature from about 220° F. to about 400° F., depending chiefly upon the rate of feed, and also upon the depth of material through which the heat must penetrate in effecting the cure.

The impregnated mats are pulled downwardly through and extracted from the die or forming device as the beam B is moved downwardly. This downward movement of the beam is effected by a connection of the beam as indicated at 35 with the two ends of chain loops 36, the upper portions of which are carried by sprockets mounted on a shaft 37, and the lower portions of which are carried by sprockets mounted on a shaft 38. The shaft 38 is arranged for connection with the motor M by means of the disconnectible dog clutch 39.

Periodically the apparatus may be stopped and appropriate lengths of the downspout (and also of the gutter if this is also being made) may be cut off, and then the vise beam is raised again and the vises V and V1 clamped again to the free end of the piece emerging from the dies, and the extraction of another length proceeds.

As will be seen in FIGURES 6 and 9, the die structure D is mounted on a supporting plate 40 which is conected to an upright bracket structure 41 having a base potrion 42 which in turn is mounted upon beams or channel pieces 43 which are carried on the cross beams 34 of the main frame structure F.

The connection between the base 42 of the bracket structure and the channel members 43 includes adjustable bolts 44, three of which are provided as will be apparent from FIGURE 9. These bolts pass through elongated slots 45 in the base 42 and because of the use of pairs of nuts on each bolt, between which the base 42 is clamped, it is possible to adjust the base and thus the die not only in the horizontal direction by virtue of the slotted holes 45, but also in the vertical direction and as a matter of fact in any angular direction, so that the angularity of the die passage may thereby be adjusted wtih respect to the line of pull of the puller mechanism. This is of especial advantage for reasons which will be brought out more fully herebelow with reference to the third embodiment to be described. The mounting plate 40 for the die extends upwardly from the die as will be seen in FIGURES 6, 7 and 8 toward its upper end this plate is provided with a bracket 46 by means of which the upper end of the core C is suspended within the cavity in the die, and in view of this arrangement the die and core are both adjustable together as a unit in any desired direction or in order to effect any desired angularity of the die passage.

The relationship of the resin pan RP to the die and core is best illustrated in FIGURES 7 and 8. As there seen, the resin pan is opened at the bottom to communicate with the upwardly open end of the annular confining pasage between the die and core, for ingress not only of the resin itself but also of the fiber reinforcement which is descending through the resin in the bath and into the forming device. The core of the die is preferably provided with a reduced size or cross section toward its upper end, adjacent the upper end of the die in order to provide some taper in the inlet opening of the die, so that the impregnated fibrous materials entering the inlet end of the die will be effectively compressed or compacted and so that the excess resin with which the fiber reinforcement is impregnated will be expelled or ejected back up into the body of the resin in the resin pan. This taper toward the upper end of the die structure appears to best advantage in the diagrammatic or isometric view of FIGURE 11 in which a taper appears at 47 in a region such that when the core is placed within the die, this tapered part extends somewhat down into the upper end of the die cavity, and therefore provides a taper in the inlet end portion of the annular passage formed between the die and core.

Also, as best seen in FIGURES 10 and 11, the die and the core are both provided with heating and cooling systems, as follows:

Toward the upper end of the die, passages diagrammatically indicated at 48 are provided for the circulation of a cooling liquid, such as water, either at ordinary supply temperature or, if desired, somewhat refrigerated. This cooling liquid may be delivered to and discharged from the passage 48 by supply and discharge connections 49 and 50.

In the mid region of the die there are heating means, advantageously in the form of electrical heating elements such as shown at 51, these being located in drilled chambers provided in the walls of the die.

Toward the lower end of the die are cooling pasages 52 adapted to be supplied with cooling liquid through connection 53 and 54.

In zones or regions generally corresponding to the cooling, heating and cooling zones of the die, the core shown in FIGURE 11 is similarly provided with three zones for cooling, heating and cooling. Thus, toward the top of the core are passages 55 supplied by means of connections 56 and 57 through which a cooling medium such as water is circulated. In the mid region of the core are heater elements 58, and in the lower region of the core are additional cooling passages 59, supplied by connections 60 and 61.

The cooling conections 60 and 61 necessarily pass through the heated zone in the mid region of the core, since all of the supply connections must extend to and out of the core structure at its upper end. Because of this I prefer to thermally insulate the cooling connections for the lower cooled region, as indicated by the insulaing sleeves 62 and 63, these sleeves being extended through the region of the heater elements 58.

From the foregoing, the general arrangement of the parts utilized in the second embodiment of apparatus will be clear. Further details may be noted, if desired, by reference to the more detailed description appearing in my copending application Ser. No. 44,050. Likewise, the general nature of the operation will be apparent from the description already given, but certain particular aspects of the operation are especially to be noted, as follows:

In this vertical arrangement of the equipment, as embodied in the second form, numerous advantages are attained many of which are pointed out in the aforementioned copending application Ser. No. 44,050. Briefly, the employment of this arrangement provides a great convenience in the handling of the fiber reinforcement and also provides a particularly effective impregnation system, since the fibrous reinforcement is impregnated as a result of the downward passage of the fibrous materials into and through the resin in the resin pan, the impregnated materials then being directly passed into the entrance end of the confining passage in the forming device.

However, in such an arrangement and with the employment of a heat hardenable resin as is here contemplated, the heated zone in the forming device (which heated zone is necessary for the purpose of effecting the cure) is located below the resin pan, and in addition the upper end of the die and core structure necessarily come in contact with the resin in the resin pan. With a heat hardenable resin, this would tend to effect premature curing of the resin in the resin pan, unless special provision is made to avoid this result. This is accomplished according to the present invention by employment of the cooling zone intermediate the heating zone and the bottom of the resin pan. Thus, the entrance end portion of the forming device is desirably provided with passages for a cooling medium and, in the case of a forming device comprising both a die and a core, it is preferred to provide such passages in both the die structure and also in the core structure. The passages 48 in the die structure and the passages 55 in the core structure as shown in FIGURES 10 and 11 serve the purpose just referred to.

With further reference to the matter of cooling the entrance end portion of the forming device, it should also be noted that in the embodiment of FIGURES 6 to 11, portions of the forming device, in effect, constitute a part of the wall of the resin pan itself. Thus, in the absence of special cooling arrangements, the heat introduced into the system in the mid region of the die for curing purposes would, by conduction, be communicated directly to the resin in the resin pan and would cause undesired premature setting of the resin in the resin pan.

From comparison of FIGURES 10 and 11 which represent the die and core generally in the same vertical position which they would occupy were they assembled, it will be seen that the cooling zone provided by the cooling passages 55 in the core lie just below the tapered portion 47 of the core. However, the effect of this cooling is of course felt by conduction in the regions of the core above the passages 55, so that the core is cooled in the region in which the confining passage in the forming device is tapered toward its inlet end. This has the several advantages referred to hereinabove in connection with the first embodiment of apparatus which is also disclosed in my copending application Ser. No. 2,760. In addition to these advantages, the fact that the cooling effect of the passages 55 in the core is felt in the regions of the core above those passages, is also of advantage for the further reason that the core extends upwardly through the resin in the resin pan and therefore is exposed to the resin throughout the entire depth of the resin bath. This is an aid to keeping the temperature of the resin in the bath down to a value which will avoid any appreciable setting or curing of the resin prior to the time the resin reaches the curing zone in the confining passages.

For this same general purpose of avoiding transmission of heat to the entrance end portion of the die and to the resin in the reservoir, the mounting plate 40 and the die D are interconnected through a layer of insulating material indicated at 40a in FIGURE 9, and the portion of the mounting plate near the upper end of the die is cooled by circulation of cold water therethrough, as by means of the connections 49a and 50a appearing in FIGURES 6 and 10.

While it is preferred for at least most arrangements for producing hollow articles to provide sequential cooling, heating, and cooling in the core of the structure as well as in the surrounding die, this may not always be essential, especially with respect to the heating means. For example, where the wall thickness of the hollow piece being made is relatively small, sufficient heat may be supplied for curing by providing a heating zone in the surrounding die only, omitting the provision for heating in the core. However, it is of importance that whatever arrangement is used, the transmission of heat from any warm or heated zone through the core to the resin in the reservoir should be avoided, and cooling of the core may be desirable in the upper region of the core, even where positive heating means are not employed in the core, because the core will nevertheless be subjected to some heat in the curing zone as a result of the heat applied in that zone by the heating means associated with the surrounding die.

In connection with the vertical arrangement of the apparatus as disclosed in FIGURES 6 to 11 attention is directed to another advantageous feature of that arrangement. Because of the downward flow of the fiber reinforcement through the resin bath and into the upper or open end of the confining passage in the forming device, this system is very readily adapted to the use of certain other materials in admixture with the resin in the reservoir. For example, various dry insoluble filler powders, such as clays, silicas, asbestos fibers and wood flour may be used. Moreover the vertical arrangement of the apparatus is particularly effective for the use of certain pigments. In the event of use of pigments or other fillers of insoluble character, there is a tendency for these materials to settle, and since, in the vertical arrangement, the settling would occur in the bottom of the resin reservoir, the feed of these materials with the resin and with the fiber reinforcement is more uniform than is true in the event of a horizontal arranged apparatus, in which latter under some circumstances at least, stirring or agitation would be required to avoid excessive settling of the filler or pigment, with consequent reduction or fluctuation of the quantity fed with the resin and the fiber reinforcement.

The cooling toward the exit end of the forming device is preferably effected to such an extent as to lower the temperature of the formed article below the heat distortion point, i.e., below about 200° F., in order to assure that the article will retain the shape of the die after its emergence from the confining passage.

Turning now to the third embodiment herein illustrated, it is first pointed out that in this third embodiment the general flow direction of the materials and of the article being formed is again horizontal, as in the first embodiment. However, there are certain structural and operational differences here present as compared with the first embodiment.

The overall layout of the apparatus according to this third embodiment appears in somewhat simplified form in FIGURE 12. Here it will be seen that the equipment includes a puller mechanism of a different type than employed in either of the first or second embodiments. In the third embodiment the puller mechanism comprises a pair of crawler treads cooperating with each other to grip the piece being formed therebetween and effect the feed of the materials and also of the piece being formed through the forming device. This crawler tread mechanism is diagrammatically indicated in FIGURE 12 at CT. FIGURE 12 also shows that the puller mechanism is mounted on a frame structure including supports 64 which are firmly mounted on a foundation such as the floor 65. The puller mechanism is driven by means of a motor 66 through speed reduction mechanism 67 and transmission units enclosed in casing parts 68, the details of this drive mechanism not being illustrated or described herein as they form no part of the present invention per se.

From FIGURE 12 it will further be observed that the puller mechanism includes longitudinal main frame members such as shown at 69 (see also FIGURE 13) carrying at one end (the right hand end in FIGURES 12 and 13) a thrust carrying abutment or bracket structures 70 supporting an abutment or thrust plate 71 which serves as a mounting means for the forming device, as will be described herebelow with more particular reference to FIGURES 13 to 18 inclusive.

The forming device, which is generally indicated at FD in FIGURE 12 is mounted upon a bracket 72 which in turn is secured to and supported by the thrust plate 71 above mentioned. The resin supply or pan 73 is mounted on the end of the forming device remote from the puller mechanism, and fiber reinforcement, such as strips of mat or woven glass fiber material 74, is fed into the pan and into the forming device, there being three such strips here shown, the supply spools 75 for only two of which appear in the figure. These supply spools may be supported in any convenient manner as by one or more upright post supports 76 which are adjustable toward and away from the remainder of the apparatus along the base guideway support 77 anchored or otherwise supported on the floor 65.

As best seen in FIGURES 13, 15 and 16, the apparatus of the third embodiment is herein illustrated as constructed to produce a channel piece having a base or web 78 and side flanges 79. For this purpose the forming device comprises upper and lower mating die parts forming a channel-shaped confining passage therebetween corresponding to the shape of the channel to be formed. These upper and lower die parts are indicated at 80 and 81 in FIGURES 13 and 19 to 27 inclusive. The upper part 80 comprises a channel structure as will be seen from the the transverse section of FIGURE 27, adapted to fit over the upper central portion of the lower die part 81 when viewed as in FIGURES 21 and 22, thereby forming a channel-shaped passage between the two die parts adapted to act as the confining passage for the channel shape desired.

As will be seen in FIGURES 13 and 26, the entrance end portion of the upper die part 80 is cut away or tapered at 82 in order to provide a tapered inlet end portion for the confining passage between the two die parts. The remainder of the passage formed between the two die parts is preferably of substantially uniform cross-sectional dimension.

As will be seen from FIGURE 13, the fiber reinforcement strips 74 are fed into the resin pan 73 over the end wall thereof and thence pass under an arcuate guide 83. From this guide the strips pass through the resin in the bath to the entrance end of the confining passage in the die in which the strips are partially folded, so to speak, in order to deflect the marginal portions of the strips downwardly so as to lie in the planes of the flanges of the channel to be produced. This action is indicated by the divergent lines extended from the guide 83 to the entrance end of the die in FIGURE 13. During the course of the traverse of the webs through the resin pan, the webs lie within the resin bath itself, preferably entirely below the surface thereof, and as will be seen from FIGURE 13, the level of the resin bath is desirably kept at least as high as the uppermost portion of the flared or tapered entrance end of the confining passage in the die. In this way the fiber reinforcement is always effectively impregnated with excess resin material which, as the feed progresses and the impregnated material is compressed or compacted, is expelled to return to the body of the resin in the resin pan.

The crawler treads of the puller mechanism as shown to the left of FIGURE 13 include upper and lower mating shoes 84 and 85 which are shaped to respectively engage the upper and outside surfaces and the lower and inside surfaces of the channel being formed. This puller mechanism therefore tightly grips the channel piece being formed and is capable of exerting a large pull on the formed piece so as to move the piece through the forming device as it is being formed and also feed the reinforcement from the supply reels to and through the resin bath and into the die. The thrust or load is directly carried from the puller mechanism through its frame structure by means of the thrust bearing bracket structures 70 and the thrust plate 71, to which the forming device is fastened.

From FIGURES 13 and 24 to 27, it will be seen that the parts of the die structure are provided with means for cooling and heating various regions of the die parts, as will now be explained.

Toward the entrance end of each of the die pieces 80 and 81, circulating passages are provided in the upper die piece 86 and in the lower die piece 87. These provide for the circulation of a cooling liquid, for instance, water either at normal supply temperatures or cooled or refrigerated as needed, in order to cool the entrance end portion of the die structure, this being of importance for a variety of reasons which have already been mentioned above in connection with the first and second embodiments. It may here be noted that in the third embodiment, the portions of the die structure surrounding the entrance end opening of the confining passage are actually directly exposed to the resin in the resin bath, notwithstanding the fact that the third embodiment is arranged horizontally, rather than vertically. Stated in another way, the entrance end portion of the forming device constitutes a part of the wall of the resin bath. This is of advantage in providing for entrance of the fiber reinforcement into the confining passage in fully impregnated condition, but in this situation, cooling of the entrance end portion is of special importance because of the possibility for direct heat transfer between the die and the resin in the bath. Also as in the first and second embodiments, the cooling of the entrance end portion serves to avoid return of partly cured resin from the entrance end of the die back into the reservoir, when the excess of resin is expelled from the entrance end of the die as a result of the compressing or compacting action of the die upon the impregnated fiber reinforcement entering the die.

With thermosetting resins of the kind hereinabove mentioned, is it desirable to maintain the entrance end portions of the die at a temperature below about 130° F.

The mid section of the two die parts 80 and 81 is heated, as in the embodiments previously described. For this purpose, the die parts 80 and 81 are provided with recesses or cavities such as shown at 88 and 89, in which electrical heating elements may be disposed.

The exit end portions of the die parts 80 and 81 are also provided with passages 90 and 91 for the circulation of a cooling medium or liquid, such as water, which is advantageous in order to reduce the temperature of the cured or formed piece below the heat distortion point before the formed piece is extracted from the forming device by the puller mechanism.

In the production of channel-shaped pieces, and especially with certain types of fabric reinforcement employed in making the channel piece, I have found that there is sometimes a tendency for the channel piece to distort or warp as it is being formed, particularly in instances where the rate of production and the temperatures are not such as to effectively reduce the temperature of the entire piece below the heat distortion point before delivery from the die. Such distortion or warpage I have found tends to occur in the direction indicated in FIGURE 15, i.e., the channel tends to assume a "sway-back" curvature.

I have further found that this tendency can be overcome by arranging the axis of the passage through the forming device in a certain angular relation to the line of pull through the puller mechanism. This angular relationship is shown in FIGURE 16 in which it will be seen that the axis of the die occupies a position other than 180° with respect to the line of pull of the puller mechanism, this angle being less than 180° when measured inside the channel shape in a plane perpendicular to the base or web of the channel. Although for a channel of given size and type, this angle may be preset, the apparatus advantageously includes a mechanism for varying the angle between the die axis and the line of pull. This is accomplished in the embodiment here illustrated by adjusting the angle of the mounting of the forming device on the thrust carrying bracket structure 70–71. Specifically, the die mounting bracket 72, as will be seen in FIGURES 16 and 18, is connected to the thrust plate 71 by means of bolts 92 having heads engaged in the plate 71, together with angle adjusting screws 93 which are threaded in the bracket 72 in positions to bear against the thrust surface of plate 71. The arrangement desirably includes four of the bolts 92 and also four of the adjusting screws 93 arranged toward the corners of a square, so that the brackets 72 can be adjusted angularly with respect to the plate 71 in any plane.

I have further found that from time to time a channel piece or other shape, especially where either the cross section of the shape itself or the fiber reinforcement employed is not completely symmetrical with respect to the axis of the piece, has a tendency to warp in some plane other than that illustrated in FIGURE 15, for instance, in a plane at right angles to the plane of curvature shown in FIGURE 15. This other type of curvature is illustrated by way of example in FIGURE 17. In FIGURE 18 there is illustrated the type of adjustment which has been found to correct for a curvature or warpage of the kind shown in FIGURE 17.

The foregoing mounting of the die structure on the thrust carrying bracket 70 is of advantage in providing for substantially direct transmission of the loads or thrust of the pulling action from the die structure to the frame of the puller mechanism itself. This mechanism not only effectively carries the heavy loads of that thrust, even the heavy loads encountered in handling large pieces of complicated cross section, but in addition this mechanism provides a simple and effective arrangement for varying the angle between the axis of the forming device and the line of pull. Smooth and chatter-free operation results from the arrangement shown while problems of warpage can readily be compensated for. Various of the foregoing features are also present in the first and second embodiments above described. Specifically, it may be noted in FIGURES 6 and 9 there are illustrated adjusting bolts and nuts by means of which the angle of the axis of the die may be altered with respect to the line of pull of the puller mechanism.

It is further noted that with the arrangement just described, the resin pan, being secured to or mounted on the forming die, moves with the forming die during any adjustment and therefore even when the angle of the forming die is adjusted, the fiber reinforcement is still fed into the entrance end of the die in the same relationship as would obtain prior to the adjustment, since both the resin pan and the guide elements for the fiber reinforcement which are associated with the resin pan move with the die.

In connection with all of the embodiments described above, it is to be noted that it is desirable to provide the forming psasage or passages in the die structure with smooth surfaces. Polishing of steel surfaces is useful for this purpose, as is also chromium plating of such surfaces, with subsequent polishing or buffing. Moreover, it is still further advantageous in the process to incorporate a lubricant in the resin material in order to facilitate drawing the piece being formed through the forming passage. A particularly effective lubricant for this purpose is carnauba wax which may advantageously be employed in an amount ranging from a fraction of 1%, for instance from about .1%, to about 5% by weight of the resin used. A partciularly effective range is from 1% to 2%.

I claim:

1. Apparatus for forming continuous lengths of fiber reinforced resin articles from fiber reinforcement impregnated with a hardenable liquid resin material, comprising puller mechanism including a frams structure and driven gripping and pulling elements mounted on the frame structure and adapted to frictionally engage the formed articles to effect feed thereof through the apparatus during the forming and hardening of the articles, a forming device having a confining passage therein through which the resin impregnated fiber reinforcement is fed and in which the fiber reinforced resin articles are formed and solidified, mechanism for delivering fiber reinforcement impregnated with a hardenable resin material into the entrance end of the confining passage in said forming device, and mechanism for interconnecting the forming device and the frame of the puller mechanism including means for adjustably varying the angle between the line of pull of the puller mechanism and the axis of the passage in the forming device.

2. Apparatus according to claim 1 in which said mechanism for delivering resin impregnated fiber reinforcement into the entrance end of the passage in the forming device is interconnected with the forming device to thereby retain a given relation to the forming device when the angle between the line of pull of the puller mechanism and the axis of the passage in the forming device is varied.

3. Apparatus for forming continuous lengths of fiber reinforced resin articles from fiber reinforcement impregnated with a heat hardenable liquid resin material, comprising puller mechanism including a frame structure and driven puller elements mounted on the frame structure and adapted to frictionally engage the formed articles to effect feed thereof through the apparatus during the forming and hardening of the articles, a forming device having a confining passage therein through which the resin impregnated fiber reinforcement is fed and in which the fiber reinforced resin articles are formed and solidified, mechanism for delivering fiber reinforcement impregnated with a hardenable resin material into the entrance end of the confining passage in said forming device, and machanism for mounting the forming device on the frame of the puller mechanism including means for adjusting the angle of the axis of the passage in the forming device with respect to the line of pull of the puller mechanism.

4. Apparatus according to claim 3 and further including a supply reservoir for a liquid resin material and means for guiding fiber reinforcement through the resin in said reservoir to effect impregnation thereof, said reservoir being mounted on the forming device for movement therewith during adjustment of the angle of the axis of the passage in the forming device with respect to the line of pull of the puller mechanism.

5. Apparatus for forming continuous lengths of fiber reinforced resin articles from fiber reinforcement impregnated with a hardenable liquid resin material, comprising puller mechanism including a frame structure and driven puller elements mounted on the frame structure and adapted to frictionally engage the formed articles to effect feed thereof through the apparatus during the forming and hardening of the articles, a forming device having a confining passage therein through which the resin impregnated fiber reinforcement is fed in which the fiber reinforced resin articles are formed and solidified, mechanism for delivering fiber reinforcement impregnated with a hardenable resin material into the entrance end of the confining passage in said forming device, and mechanism for mounting the forming device on the frame of the puller mechanism including means for adjusting the position of the forming device with respect to the line of pull of the puller mechanism.

6. Apparatus for use in forming elongated shapes composed of fibre reinforced resin materials, comprising a forming device comprising a die with a die passage into which liquid heat curable resin and fibre reinforcement are fed and in which the resin is cured and in which the shape is solidified, mechanism for pulling the formed shape out of the forming device, a common frame support for the pulling mechanism and the forming device, and mechanism mounting the forming device on the common support providing for adjustably fixing the forming device in various positions with respect to said common support.

References Cited

UNITED STATES PATENTS

| | | | |
|---|---|---|---|
| 2,624,498 | 1/1953 | Koch | 264—174 |
| 2,679,924 | 6/1954 | Powell | 264—172 |
| 2,948,649 | 8/1960 | Pancherz | 264—174 |
| 2,871,911 | 2/1959 | Goldsworthy et al. | 156—441 |
| 3,034,566 | 5/1962 | McKay | 156—180 |
| 2,682,292 | 6/1954 | Nagin | 18—2 |
| 2,977,630 | 4/1961 | Bazler | 18—45 |

OTHER REFERENCES

Bjorksten, "Polyesters and their Application," Reinhold Pub. Corp., New York (1965), p. 114, second full paragraph.

DONALD J. ARNOLD, *Primary Examiner.*

U.S. Cl. X.R.

264—174